United States Patent [19]

Kurgan

[11] Patent Number: 5,615,260
[45] Date of Patent: Mar. 25, 1997

[54] APPARATUS FOR ACCEPTING AND RETAINING A SMART CARD

[75] Inventor: Jeffery F. Kurgan, Hoffman Estates, Ill.

[73] Assignee: Motorola, Inc., Schaumburg, Ill.

[21] Appl. No.: 558,253

[22] Filed: Nov. 17, 1995

Related U.S. Application Data

[63] Continuation of Ser. No. 65,698, May 24, 1993, abandoned, which is a continuation of Ser. No. 799,818, Nov. 29, 1991, abandoned.

[51] Int. Cl.$^6$ ........................................ H04M 1/00
[52] U.S. Cl. ........................ 379/433; 379/429; 379/434; 379/144
[58] Field of Search .................... 379/58, 144, 357, 379/433, 428, 420, 434; 235/441, 449, 483, 486, 492, 61, 78, 482, 632, 379, 380; 455/300, 301

[56] References Cited

U.S. PATENT DOCUMENTS

| | | | |
|---|---|---|---|
| 3,816,911 | 6/1974 | Knappenderger | 455/300 |
| 4,086,442 | 4/1978 | Richard | 379/357 |
| 4,595,798 | 6/1986 | Brodbeck | 379/357 |
| 4,650,981 | 3/1987 | Foletta | 235/449 |
| 4,790,007 | 12/1988 | Richter et al. | 379/420 |
| 4,904,852 | 2/1990 | Mita et al. | 235/441 |
| 4,976,630 | 12/1990 | Schuder et al. | 439/260 |
| 5,012,078 | 4/1991 | Pernet . | |
| 5,198,645 | 3/1993 | Martin et al. | 235/441 |
| 5,257,414 | 10/1993 | Trahan et al. | 485/90 |

FOREIGN PATENT DOCUMENTS

| | | | |
|---|---|---|---|
| 121927 | 10/1984 | European Pat. Off. | 379/144 |
| 0214478A2 | 3/1987 | European Pat. Off. . | |
| 0254316 | 1/1988 | European Pat. Off. . | |
| 276403 | 8/1988 | European Pat. Off. | 379/58 |
| 0282296A2 | 9/1988 | European Pat. Off. . | |
| 0316700A1 | 5/1989 | European Pat. Off. . | |
| 2587549 | 12/1987 | France . | |
| 3343757 | 6/1985 | Germany | 379/144 |
| 3610202 | 10/1986 | Germany | 379/144 |
| 3810275A1 | 10/1989 | Germany . | |
| 2193745 | 1/1988 | United Kingdom . | |
| 2220777 | 1/1990 | United Kingdom . | |

OTHER PUBLICATIONS

ITT ElectroMechanical Components Worldwide. Brochure containing their range of Smart Card Connectors. This brochure describes the available range of smart card connectors from ITT. Nov. 1991.

Amphenol Industrial Technology Division. Brochure containing various chip card readers. Nov. 1991.

Amphenol Industrial Technology Division. Catalogue containing Amphenol's range of chip card readers. Nov. 1991.

Primary Examiner—Thomas W. Brown
Assistant Examiner—Jack Chiang
Attorney, Agent, or Firm—Kirk W. Dailey; Randall S. Vaas

[57] ABSTRACT

The present patent application includes a discussion of an integrated information card reader. The card reader is integrated into a radiotelephone (101). The card reader has a set of electrical contacts imbedded in a sliding plate (205). The sliding plate (205) is coupled to at least a portion of the other electronic apparatus contained in the radiotelephone (101) and enhances the rigidity of the radiotelephone (101). The card reader also includes a cover plate (213). The cover plate (213) and the sliding plate (205) form a cavity for retaining an information card (105). The cover plate (213) has cantilevered springs (309, 313) shaped from its body for forcing the information card (105) against the first set of contacts (403) when the information card (105) is loaded. Additionally, the cover plate (213) provides shielding at least a portion of the electronic apparatus from electromagnetic and radio frequency interference (EMI, RFI).

6 Claims, 3 Drawing Sheets

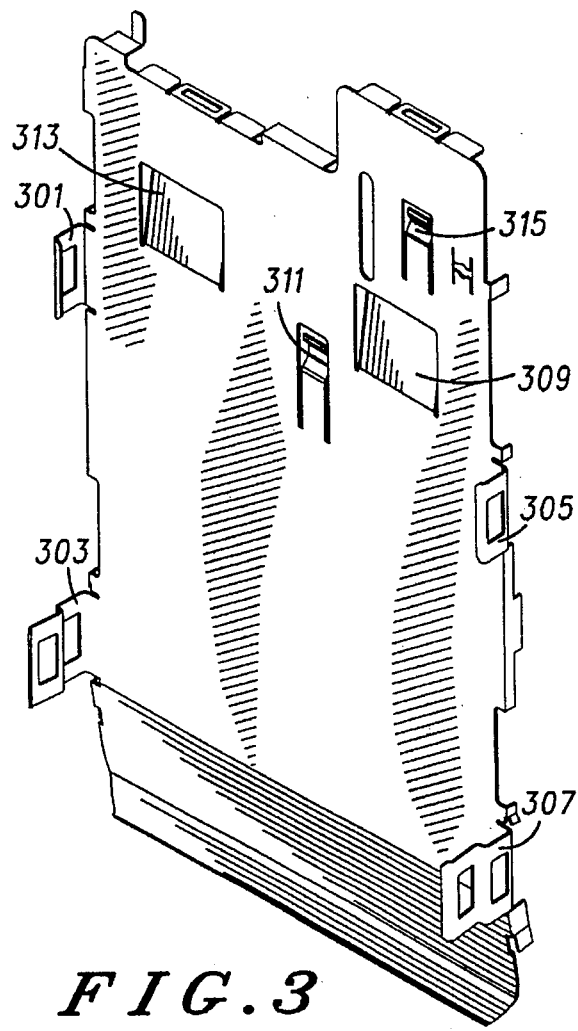
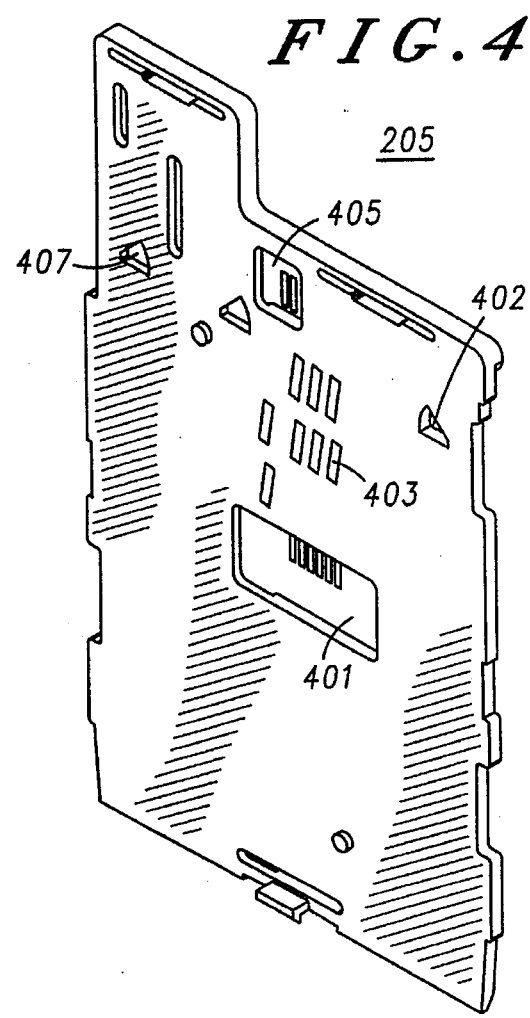

APPARATUS FOR ACCEPTING AND RETAINING A SMART CARD

This is a continuation of application Ser. No. 08/065,698, filed May 24, 1993 and now abandoned, which is a continuation of application Ser. No. 07/799,818 filed Nov. 29, 1991 and now abandoned.

FIELD OF THE INVENTION

Generally, this invention relates to accepting, retaining and making electrical contact between a smart card and another electronic device, and more specifically, to a radiotelephone containing an integrated apparatus for accepting and retaining card shaped electrical devices and making electrical contact between the card and internal electronic devices of the radiotelephone.

BACKGROUND OF THE INVENTION

Typically, the type of apparatus described herein are referred to as card readers and are used in applications such as telephone billing, banking, cinema and mass transportation applications. However, the apparatus may also allow writing of information to the smart cards. The smart cards may contain integrated circuits, microprocessors or read/write memory.

The smart cards use in radiotelephones currently has been limited to the subscriber identification module (SIM) cards for use in the European market. SIM cards are available in two sizes; the full size card and the chip card. Self-contained SIM card readers can be bought from vendors. However, the self-contained units are cumbersome, because of the redundant walls and the necessary connectors for interfacing to other electronic devices. The size and integral design are important in a portable radiotelephone. Therefore, a need exists for an integrated smart card retention apparatus for use in a portable radiotelephone.

SUMMARY OF THE PRESENT INVENTION

The present invention encompasses an integrated information card reader. The card reader is integrated into a housing containing other electronic apparatus. The card reader has a set of electrical contacts imbedded in a substantially planar platform. The planar platform is coupled to at least a portion of the other electronic apparatus. The card reader also includes a cover plate raised above the planar platform, such that the cover plate and the planar platform form a cavity for retaining an information card. The cover plate has cantilevered springs shaped from it s body for forcing the information card against the first set of contacts when the information card is loaded.

BRIEF DESCRIPTION OF THE DRAWINGS

FIG. 3 is a detailed illustration of the cover plate 213 in accordance with the present invention.

FIG. 4 is a detailed illustration of the sliding plate 205 in accordance with the present invention.

DETAILED DESCRIPTION OF THE PREFERRED EMBODIMENT

Figure 1:
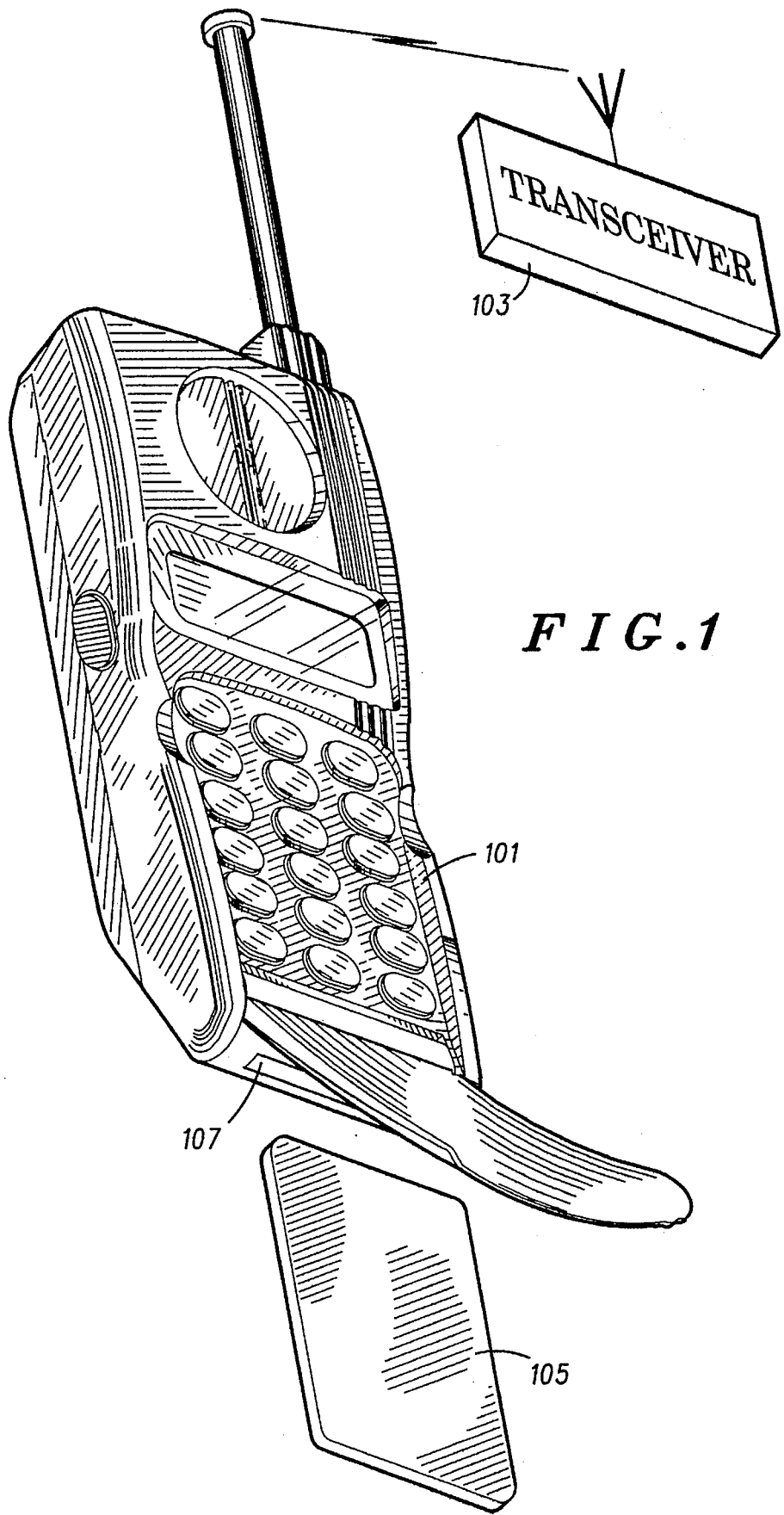
FIG. 1 is a block diagram of a radiotelephone system which may employ the present invention.

FIG. 1 is a block diagram of a radiotelephone communications system in accordance with the present invention. The fixed site transceiver 103 transmits and receives radio frequency (RF) signals to and from mobile and portable radiotelephones located within a fixed geographic service area. Radiotelephone 101 is one of the portable radiotelephones served by the fixed site transceiver 103. The RF signals transmitted between the fixed site transceiver 103 and the portable radiotelephone 101 include data or voice signals, subscriber identification, and billing information. The billing information sent from the portable radiotelephone 101 to the fixed site transceiver 103 is stored in a memory contained on a smart card 105. The smart card 105 can be a full size or a chip size smart card. The billing information contained within the smart card 105 is read by the smart card reader contained within the radiotelephone 101 and illustrated in subsequent figures.

Figure 2:
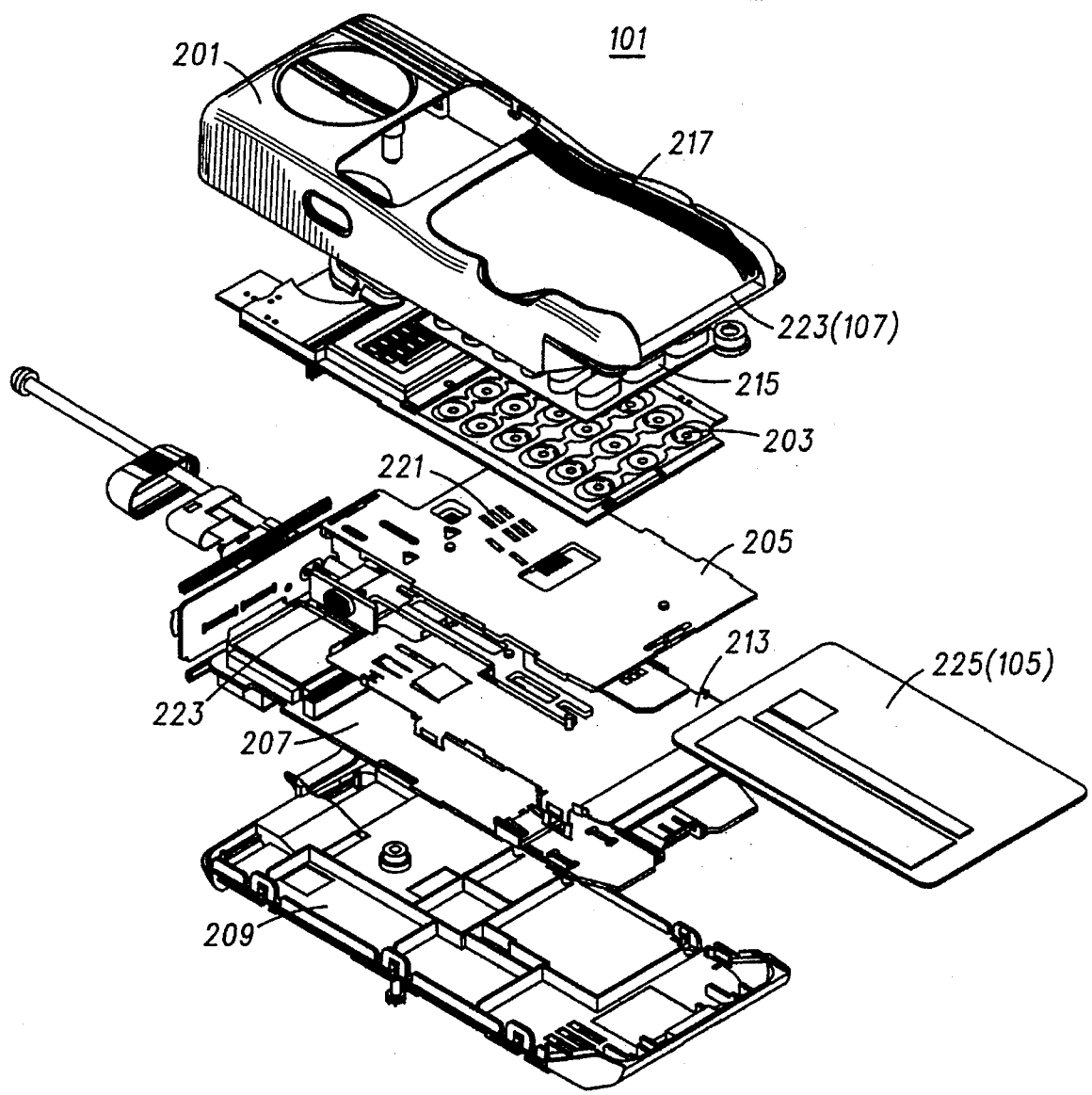
FIG. 2 is an exploded view of the radiotelephone 101 in accordance with the present invention.

FIG. 2 is an exploded view of the portable radiotelephone 101 of FIG. 1. The exploded view includes a front housing 201, the flip 217, the keypad 215, the keypad circuit board 203, the slider plate 205, the cover plate 213, the RF/logic circuit board 207, and the rear housing 209. When the radiotelephone 101 is fully assembled, the keypad circuit board 203 is mounted to the front housing 201 holding the keypad 215 in place. Additionally, the rear housing 209 and the front housing 201 are coupled together and shaped to form an opening 107 in the backside of the housing for accepting the smart card 105.

On the backside of the keypad board 203 there are six contact solder pads. The contacts 221 of the smart card reader are surface mounted to the six contact solder pads on the keypad board 203. These contacts 221 make electrical connections to the electronic devices contained within the radiotelephone 101. This connection is subject to a 0.5 newton loading as described in the International Standards Organization (ISO) document #7816-2: 1988 (E), Technical Committee ISO/TC 97, *Information Processing Systems,* 1988-05-15, First Edition.

In the preferred embodiment, the contacts 221 are molded into the slider plate 205 and surface mounted to the contact solder pads on the back of the keypad board 203. The slider plate 205 enhances the rigidity of the radiotelephone's structural housing and is designed to be an integral part of the radiotelephone 101. The slider plate 205 is made of a light strong material. In the preferred embodiment the material used is a fiberglass composite. Additionally, the slider plate 205 may be used as a smooth sliding surface for the smart card 105 above the plane of the keypad board above any additional components which may be mounted to the back of the keypad board 203 such as a surface mount LEDs or the like.

Alternatively, the contacts can be directly mounted to the backside of the keypad board 203. If no additional rigidity is desired and there are no components on the back of the keypad board 203, then, the slider plate 205 can be eliminated and the keypad board 203 can function as the slider plate.

The cover plate 213 together with the slider plate 205 form a cavity for retaining the smart card 105 within the radiotelephone 101. The cover plate 213 in the preferred embodiment is made of beryllium copper. Beryllium copper is used to form a low cost electromagnetic interference (EMI) and radio frequency interference (RFI) shield between the RF logic board 207 and the front housing 201.

This shielding effect of the cover plate 213 reduces the amount of additive silver paint and vacuum metalization which typically is added to the front housing 201 to reduce the EMI and RFI.

Alternatively, the flip 217 attached to the front housing 201 may be designed with a cam on the lower side. When the flip is in the open position, the cam would cover the opening 107 formed in radiotelephone's housing, insuring that the smart card 105 is retained within the smart card reader during operation of the radiotelephone 101. While the flip 217 is in the closed position, exposing the opening 107 and allowing the smart card 105 to be ejected from the radiotelephone 101.

FIG. 3 is a detailed illustration of the cover plate 213 from FIG. 2. The cover plate 213 is has a complex shape. The shape is used to perform many mechanical functions that are integral to the structure of the radiotelephone 101 and the smart card reader. First, the cover plate 213 is shaped to form cantilevered springs 309, 313. The cantilevered springs 309, 313 are used to retain the smart card 105 within the cavity formed by the sliding plate 205 and the cover plate 213. These two springs 309, 313 provide enough force to meet the International Standards Organization (ISO) document #7816-2 : 1988 (E), Technical Committee ISO/TC 97, *Information Processing Systems*, 1988-05-15, First Edition. Second, the cover plate 213 is shaped to form edges 317. The edges 317 guide the smart card 105 into the cavity while the smart card 105 is being loaded by a user. Third, the cover plate 213 contains clips 301, 303, 305, 307. These clips are formed to hold together the RF logic board 207, the rear housing 209, and the card reader assembly. Fourth, the cover plate 213 is shaped to form at least one spring 311, 315. These springs retain the ejection apparatus in a loaded position when the smart card 105 is loaded in the card reader. When ejecting the card is desired, the user must use the ejector knob 223 to force the ejection apparatus past these springs 311, 315. In other embodiments, one of average skill in the art may modify the number of springs and clips formed by the cover plate 213. Additionally, one of average skill in the art may modify the type of material used for the cover plate 213. These modifications will depend upon the specific application for the card reader.

FIG. 4 is a detailed illustration of the slider plate 205 of FIG. 2. This slider plate 205 is optional depending upon the particular application of the card reader. In the preferred embodiment, the slider plate assists in adding structural integrity to the radiotelephone housing, retaining the contacts, and providing a smooth sliding surface for the smart card 105 while loading or ejecting the smart card 105 from the smart card reader. The sliding contacts 403 are aligned with the contacts on the smart card 105, when the smart card is in the loaded position. The recesses 407 are in the slider plate 205 to provide clearance above the surface mount LEDs mounted on the back side of the keypad circuit board.

What is claimed is:

1. A device comprising:

a structural housing, said structural housing containing electronic apparatus;

an opening in the structural housing for accepting a first information card having at least one electrical contact disposed thereon and a first predetermined size;

a first circuit board positioned in said structural housing;

a first set of electrical contacts carried on said first circuit board and including a first electrical contact having a first end and a second end, said first end of said first electrical contact electrically coupled to said electronic apparatus;

a sliding plate positioned over said first circuit board and having said first set of electrical contacts partially disposed within said sliding plate;

a second circuit board; and a cover plate carried on said second circuit board, said cover plate and said sliding plate defining a cavity accessable via the opening to receive the first information card and said cover plate comprising a substantially planar platform raised from the plane of, joined to and substantially parallel to said sliding plate, said substantially planar platform having a cantilevered spring integral therewith to force the information card against said sliding plate with appropriate force to retain the information card electrical contact into engagement with said first electrical contact, said substantially planar platform being made from a material that shields at least a portion of the electronic apparatus from electromagnetic and radio frequency interference (EMI and RFI).

2. The device in accordance with claim 1 wherein the cover plate further comprises edges extending between the substantially planar platform and the sliding plate along a first side and an opposing second side of the substantially planar platform that abut the opening of the information card reader.

3. The device in accordance with claim 1 wherein the cover plate is made from Beryllium Copper.

4. A radiotelephone comprising:

a housing;

a keypad;

an opening along a first side of said housing for accepting an information card into said housing;

a first circuit board;

a first set of electrical contacts carried on said first circuit board and including at least one sliding contact, each sliding contact having at least a first and a second end, said first end coupled to said first circuit board;

an information card reader slider plate raised from the plane of, joined to and substantially parallel to said first circuit board, said first set of electrical contacts at least partially disposed therein;

a second circuit board; and an information card reader cover plate carried on said second circuit board and comprising a substantially planar platform raised from the plane of, joined to and substantially parallel to said slider plate, such that said slider plate and said cover plate form a cavity for the information card, the substantially planar platform having a cantilevered spring integral therewith forcing the information card against said sliding plate with appropriate force to retain the information card, said cantilevered spring to press the information card into said first set of electrical contacts, and the cover plate is made from a material that shields at least a portion of the second circuit board from electromagnetic and radio frequency interference (EMI and RFI).

5. The radiotelephone in accordance with claim 4 wherein the cover plate further comprises edges extending between the substantially planar platform and the slider plate along a first side and an opposing second side of the substantially planar platform that abut the opening of the information card reader.

6. The radiotelephone in accordance with claim 4 wherein the cover plate is made from Beryllium Copper.

* * * * *